US006979479B2

(12) United States Patent
Lavan et al.

(10) Patent No.: US 6,979,479 B2
(45) Date of Patent: Dec. 27, 2005

(54) FLEXIBLE MATERIAL FOR LIGHTER-THAN-AIR VEHICLES

(75) Inventors: Charles K. Lavan, Medina, OH (US); Donald J. Kelly, Akron, OH (US)

(73) Assignee: Lockheed Martin Corporation, Akron, OH (US)

( * ) Notice: Subject to any disclaimer, the term of this patent is extended or adjusted under 35 U.S.C. 154(b) by 0 days.

(21) Appl. No.: 10/388,772

(22) Filed: Mar. 14, 2003

(65) Prior Publication Data

US 2004/0180161 A1 Sep. 16, 2004

(51) Int. Cl.[7] ........................ C09K 19/00; B29D 22/00; B29D 23/00; B32B 1/08

(52) U.S. Cl. ........................ 428/1.1; 428/1.5; 428/1.6; 428/36.1; 428/421; 428/423.1; 428/473.5

(58) Field of Search .............................. 428/36.1, 421, 428/423, 473.5, 1.1, 1.5, 1.6, 423.1

(56) References Cited

U.S. PATENT DOCUMENTS

| | | | | |
|---|---|---|---|---|
| 3,127,135 | A | 3/1964 | Burr et al. | 244/126 |
| 3,257,266 | A | 6/1966 | Sapper | 161/188 |
| 3,519,530 | A | 7/1970 | Struble, Jr. | 161/129 |
| 3,623,937 | A | 11/1971 | Gasaway | 161/89 |
| 3,791,611 | A | 2/1974 | Babbidge | 244/153 |
| 3,791,909 | A | 2/1974 | McKee | 156/306 |
| 3,900,662 | A | 8/1975 | Yuan | 428/252 |
| 3,974,989 | A | 8/1976 | Goodfellow | 244/126 |
| 4,020,209 | A | 4/1977 | Yuan | 428/257 |
| 4,109,543 | A | 8/1978 | Foti | 74/231 P |
| 4,122,227 | A | 10/1978 | Dean | 428/197 |
| 4,144,911 | A * | 3/1979 | Veith | 139/383 AA |
| 4,181,768 | A | 1/1980 | Severin | 428/252 |
| 4,188,445 | A | 2/1980 | Hill | 428/246 |
| 4,194,618 | A | 3/1980 | Malloy | 206/205 |
| 4,241,128 | A | 12/1980 | Wang | 428/212 |
| 4,297,408 | A | 10/1981 | Stead et al. | 428/240 |
| 4,304,813 | A | 12/1981 | Elmore, Jr. | 428/253 |
| 4,308,370 | A | 12/1981 | Fukada et al. | 526/255 |
| 4,310,373 | A | 1/1982 | Schuhmacher et al. | 156/308.2 |
| 4,311,615 | A | 1/1982 | Frosch et al. | 252/514 |
| 4,325,469 | A | 4/1982 | Gurian | 190/53 |
| 4,340,786 | A | 7/1982 | Tester | 179/110 A |
| 4,346,139 | A | 8/1982 | Osawa et al. | 428/252 |
| 4,444,822 | A | 4/1984 | Doyle et al. | 428/109 |
| 4,539,255 | A | 9/1985 | Sato et al. | 428/252 |
| 4,656,080 | A | 4/1987 | Takahashi et al. | 428/215 |

(Continued)

FOREIGN PATENT DOCUMENTS

CA 1071083 2/1980

(Continued)

*Primary Examiner*—Michael C. Miggins
(74) *Attorney, Agent, or Firm*—Renner Kenner Greive Bobak Taylor & Weber

(57) ABSTRACT

A laminate material for lighter-than-air vehicles includes a liquid crystal polymer fiber layer, a polyimide layer secured to the liquid crystal polymer fiber layer; and a polyvinylidene fluoride (PVDF) layer secured to the polyimide layer. The layers are secured to one another with a polyurethane adhesive. Adjacent laminates may be secured to one another by a PVDF cover tape on the exterior surfaces and a structural tape on the interior surfaces. The structural tape includes a liquid crystal polymer fiber layer and a polyimide layer to ensure the integrity of the vehicle. An alternative material may include a liquid crystal polymer fiber layer and a polyvinylidene fluoride (PVDF) layer disposed on both sides of the liquid crystal polymer fiber layer.

15 Claims, 2 Drawing Sheets

U.S. PATENT DOCUMENTS

| | | | | | |
|---|---|---|---|---|---|
| 4,679,519 | A | | 7/1987 | Linville | 114/103 |
| 4,708,080 | A | | 11/1987 | Conrad | 114/103 |
| 4,762,295 | A | | 8/1988 | Yon, Jr. | 244/115 |
| 4,939,026 | A | | 7/1990 | Luise | 428/224 |
| 5,057,172 | A | | 10/1991 | Woiceshyn | 156/148 |
| 5,097,783 | A | | 3/1992 | Linville | 114/103 |
| 5,118,558 | A | | 6/1992 | Mater et al. | 428/252 |
| 5,120,599 | A | | 6/1992 | Lewis | 428/298 |
| 5,161,479 | A | | 11/1992 | Mahr | 114/103 |
| 5,225,488 | A | | 7/1993 | Baird et al. | 525/132 |
| 5,408,056 | A | | 4/1995 | Thomas | 181/171 |
| 5,501,259 | A | | 3/1996 | Palm | 156/156 |
| 5,538,769 | A | * | 7/1996 | Sandman, Jr. | 428/36.3 |
| 5,628,172 | A | | 5/1997 | Kolmes et al. | 57/210 |
| 5,677,029 | A | * | 10/1997 | Prevorsek et al. | 428/113 |
| 5,776,838 | A | | 7/1998 | Dellinger | 442/200 |
| 5,836,611 | A | | 11/1998 | Palm | 280/743.1 |
| 5,837,623 | A | | 11/1998 | Howland | 442/189 |
| 5,939,340 | A | | 8/1999 | Gabbay | 442/229 |
| 5,976,996 | A | | 11/1999 | Howland | 442/189 |
| 6,013,688 | A | | 1/2000 | Pacheco et al. | 521/64 |
| 6,021,523 | A | | 2/2000 | Vero | 2/159 |
| 6,056,479 | A | | 5/2000 | Stevenson et al. | 405/258 |
| 6,074,722 | A | | 6/2000 | Cuccias | 428/107 |
| 6,319,596 | B1 | | 11/2001 | Kernander et al. | 428/215 |
| 6,368,316 | B1 | * | 4/2002 | Jansen et al. | 604/526 |
| 6,448,193 | B1 | | 9/2002 | Miskovic et al. | 442/30 |
| 2002/0016118 | A1 | | 2/2002 | Bebber et al. | 442/286 |
| 2002/0122926 | A1 | | 9/2002 | Goodson | 428/220 |

FOREIGN PATENT DOCUMENTS

| | | | | |
|---|---|---|---|---|
| DE | 31 23 436 | | 12/1982 | |
| EP | 0 103 089 | | 7/1980 | B32B 27/12 |
| JP | 54100478 | | 8/1979 | |
| JP | 04366627 A | * | 12/1992 | |

* cited by examiner

FLEXIBLE MATERIAL FOR LIGHTER-THAN-AIR VEHICLES

TECHNICAL FIELD

The present invention is generally directed to lighter-than-air vehicles. In particular, the present invention is directed to an improved laminate construction used with lighter-than-air vehicles. Specifically, the present invention is directed to a laminate construction that is light weight, possesses high strength characteristics and allows deployment of lighter-than-air vehicles at very high altitudes.

BACKGROUND ART

Lighter-than-air vehicles are used in many different applications. In one well known application companies emblazon their corporate logo or trademark on a lighter-than-air vehicle, sometimes referred to as an aerostat, and operate the vehicle near large sporting events or in large metropolitan areas. Such advertising effectively generates increased sales. Lighter-than-air vehicles are also used in high altitude applications for the purpose of weather monitoring or military surveillance. In these high altitude applications it is known that the higher the vehicle can operate, the more area that can be viewed for surveillance purposes. Moreover, the higher the vehicle is situated, the more difficult it is to detect and destroy the vehicle.

Known materials for these high altitude lighter-than-air vehicles are limiting inasmuch as they can only withstand a limited range of temperature variation. Moreover, the high altitude vehicles need to be able to withstand ozone degradation, extreme exposure to ultraviolet light, severe expansion and contraction in view of the wide temperature variations experienced in diurnal cycles, and extreme wind and weather forces. And, the lighter-than-air vehicles used for military operations are susceptible to attack by radio frequency detection, laser targeting threats and the like. Of course, the aforementioned properties need to be combined with the standard desired properties for lighter-than-air vehicles which include light weight, which allows increased payload for the vehicles, and gas barrier properties to ensure long term deployment of the vehicle.

Therefore, there is a need for lighter-than-air vehicles which use laminate or fabric materials with the above desirable properties and in which the materials or laminates is easy to manufacture and to conform to the desired shape.

SUMMARY OF THE INVENTION

Therefore, there is a need in the art for flexible laminate for lighter-than-air vehicles.

Another object of the present invention, which shall become apparent as the detailed description proceeds, is achieved by a laminate material comprising: a liquid crystal polymer fiber layer; a polyimide layer secured to the liquid crystal polymer fiber layer; and a polyvinylidene fluoride layer secured to the polyimide layer.

Other aspects of the present invention are attained by a laminate material comprising: a liquid crystal polymer fiber layer; and a polyvinylidene fluoride (PVDF) layer disposed on both sides of the liquid crystal polymer fiber layer.

Still another object of the present invention is attained by a lighter-than-air vehicle, comprising a hull; the hull comprising a laminate material comprising a liquid crystal polymer fiber layer; a polyimide layer secured to the liquid crystal polymer fiber layer; and a polyvinylidene fluoride layer secured to the polyimide layer.

Yet further aspects of the present invention are attained by a lighter-than-air vehicle, comprising a hull; the hull comprising a laminate material comprising a liquid crystal polymer fiber layer; and a polyvinylidene fluoride (PVDF) layer disposed on both sides of the liquid crystal polymer fiber layer.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
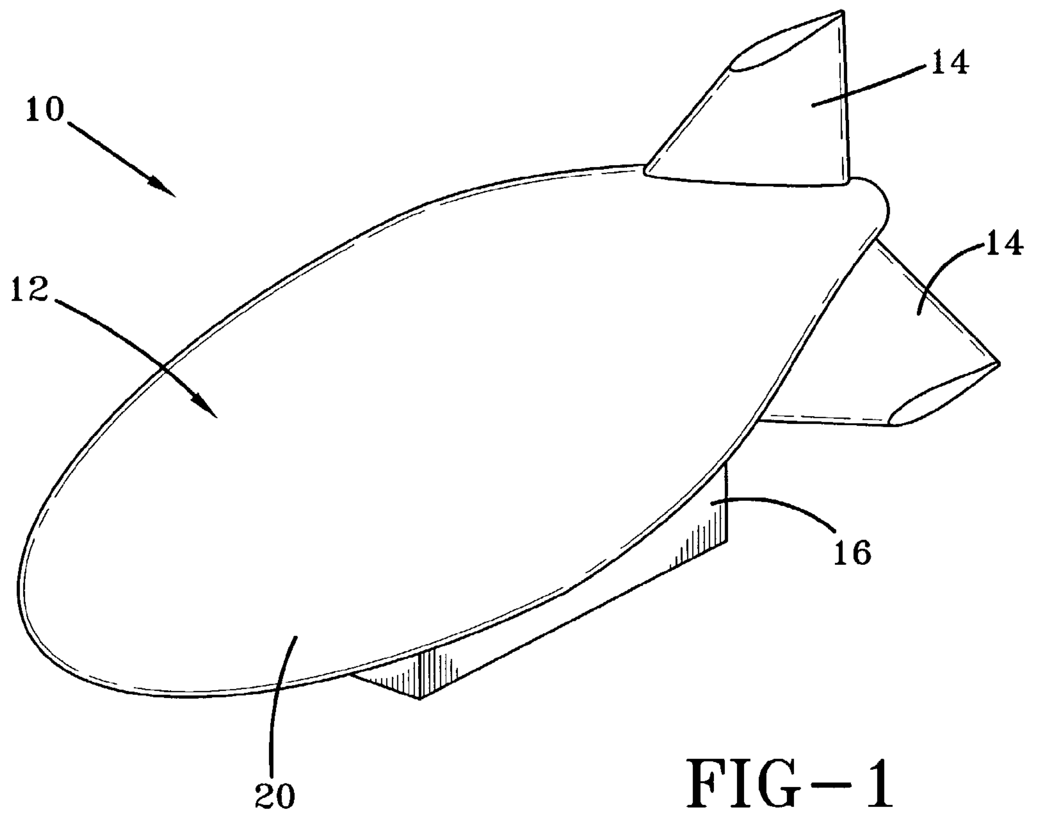
FIG. 1 is a perspective drawing of a lighter-than-air vehicle according to the present invention.

Referring now to the drawings and in particular to FIG. 1 it can be seen that a lighter-than-air vehicle according to the present invention is designated generally by the numeral 10. Although the vehicle 10 is likely to be a lighter-than-air vehicle it will be appreciated that the teachings of the present invention directed to a flexible laminate construction are applicable to any lighter-than-air vehicle such as an aerostat, a blimp, an airship or any object that is tethered or untethered. For example, the present invention could be used in hot-air balloons, regular helium balloons, weather balloons, sails, parachutes and any application where a material needs to provide superior properties for use in withstanding the rigors of an outdoor environment. In any event, the vehicle 10 includes a hull 12 with no fins or at least one stabilizing fin 14. If no fins are provided it is likely that a stabilizing element such as a vectored fan may be used. Although an oblong shape is shown for the hull, it will be appreciated that any shape—sphere, ellipse, parabolic, tear-drop, etc—could be used. The vehicle 10 may carry a payload 16 which may include personnel, surveillance devices, weather monitoring equipment, communications equipment and the like. The size of the payload varies in accordance with the size of the vehicle. The payload may be carried externally (as shown), internally or incorporated into the material such as for radar transmit/receive applications.

The vehicle 10 is constructed with an enclosing material which has many desirable properties. In general, these desirable properties are high strength; light weight, which allows for an increase in payload size; and the ability to withstand extreme temperature and pressure variations. In view of these wide temperature and pressure variations the material needs to be flexible in many conditions. It is also desirable that the laminate material be ozone and ultraviolet light resistant and have the necessary gas permeability characteristics. The material must also be able to evade targeting detection and be resistant to tearing caused by bullets and the like. It is desirable for the laminate material to have high altitude capabilities. It is believed that the constructions presented herein allow the vehicle 10 to operate at altitudes of up to 70,000 feet.

Figure 2:
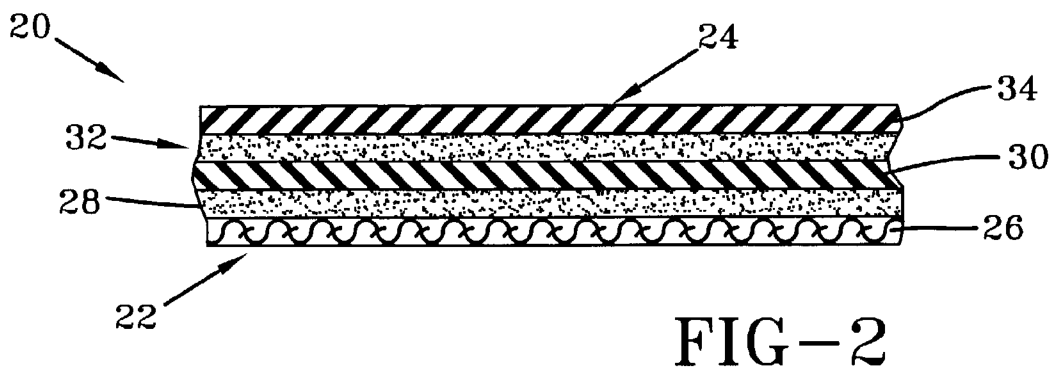
FIG. 2 is a laminate material in cross-section according to the present invention.

As best seen in FIG. 2, a laminate material according to the present invention is designated generally by the numeral 20. The material 20 has an interior surface 22 which contains or retains the lighter-than-air gas material, such as helium or the like, within the hull 12. The laminate material 20 also has an exterior surface 24 which is opposite the interior surface 22. The construction of the preferred laminate material 20 will be described in general and then the various properties that each layer of material provides will be discussed in detail.

A liquid crystal polymer fiber yarn layer 26 forms the interior surface 22. In the preferred embodiment, the layer 26 is Vectran™ or an equivalent material. An adhesive layer 28 is applied between the layer 26 and a polyimide layer 30. The primary purpose of the polyimide layer 30 is to function as a gas barrier for retaining helium or the like and scatter laser targeting threats. An adhesive layer 32 is applied to the layer 30 upon which is adhered a polyvinylidene fluoride (PVDF) layer 34 which has the primary benefit of ozone and ultraviolet light protection. The layer 34 also forms the exterior surface 24.

The liquid crystal polymer fiber layer 26 is included in the laminate primarily for its strength characteristics. The layer is a weaved fabric which has warp and fill strands much like a cloth material. The liquid crystal polymer fiber yarns are advantageous in that they are strong yet light weight. Indeed, in the preferred embodiment, the warp direction of the layer 26 has at least a tensile strength of 240 lbs. per inch and in the fill direction a tensile strength of at least 180 lbs. per inch. The liquid crystal polymer fiber material has also excellent creep resistance and flex fatigue resistence. The weave pattern may provide intermittent gaps for the purpose of reducing the overall weight of the laminate and to stop tearing in the event a bullet or other projectile punctures the laminate.

The polyimide film layer 30 is preferably constructed of Kapton™ or equivalent material. The polyimide layer 30 provides excellent bias modulus and is also an excellent gas barrier material to hold the preferred lighter-than-air material, such as helium, within the hull construction. The polyimide film also provides an excellent dielectric constant to function as a countermeasure deterrence against laser targeting threats. In other words, the polyimide material functionally diffuses any impinging laser light so that targeting information cannot be returned to the targeting device. Unfortunately, the polyimide material easily breaks down in the presence of ultraviolet light. To compensate for this deficiency, the exterior surface 24 of the laminate 20 is the polyvinylidene fluoride layer 34. The PVDF material provides excellent ultraviolet and ozone protection while allowing transmission of the laser threat to the Kapton™ layer. The PVDF layer also enhances thermal control of the vehicle and reduces its infrared signature. In other words, the temperature of the PVDF material fluctuates with the surrounding ambient temperature and any variation between the ambient and the vehicle 10 is difficult to detect. The PVDF material also has low absorptivity and high reflectance values so that it is difficult to observe the vehicle from any appreciable distance.

These layered materials 26, 30 and 34 are bonded to one another with adhesive layers 28 and 32 which in the preferred embodiment are polyurethane adhesives. It has been found that these adhesive materials are fairly easy to work with and allow for simplified manufacturing practices. In particular, the preferred polyurethane material is a fluorinated polyurethane which retains flexibility at low temperatures and is also hydrophobic in that it repels water to preclude absorption of any moisture that may penetrate the exterior surface 24. The fluorinated polyurethane adhesives are also able to withstand the high temperatures that the material is subjected to at high altitudes during daytime operations. The adhesive material bonds the layers to one another and fills in any pin holes or gaps that may be encountered in the other layers 30 and 34.

Figure 3:
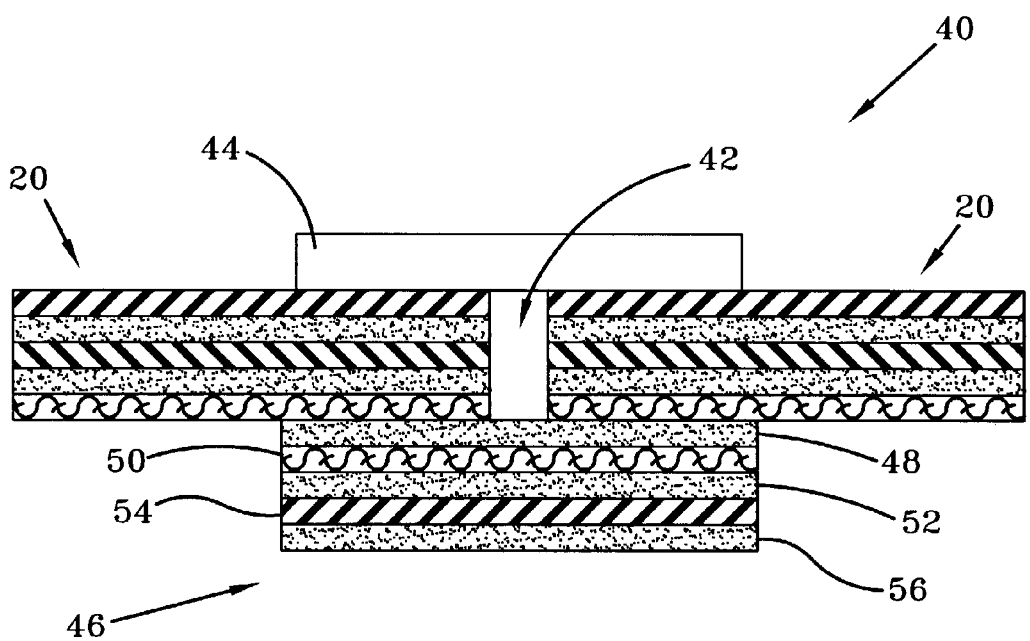
FIG. 3 is a butt joint configuration in partial cross-section joining adjacent laminate materials together.

As will be appreciated the hull 12 and fins 14 are typically not made of a single piece of the laminate material 20. Accordingly, strips or patterns of the material are adjoined to one another while still providing all the properties of the laminate material. Accordingly, reference is now made to FIG. 3 which shows a butt joint configuration designated generally by the numeral 40. The joint 40 is utilized when two lengths of the laminate material 20 are positioned side by side. A gap is provided between the two laminate materials and is designated by the numeral 42. Disposed on the exterior surface of the butt joint 40 is a polyvinylidene fluoride (PVDF) cover tape 44 which seals the gap 42 at the exterior surface 24 of adjacent laminates 20. The interior surfaces 22 of the adjacent laminates are sealed by a structural tape designated generally by the numeral 46. The structural tape 46 includes an adhesive layer 48 which in the preferred embodiment is a polyurethane adhesive. A liquid crystal polymer yarn layer 50, such as Vectran™ or its equivalent, is positioned on the underside of the adhesive layer 48 and is bonded to a polyimide layer 54 by another layer of adhesive 52. Finally, a layer of adhesive 56 is disposed on the opposite side of the polyimide layer 54 for securing the structural tape and the entire construction to any internal structural component of the hull as needed. The butt joint 40 incorporates the advantageous properties of the laminate material 20 to provide a contiguous seam with all the desirable properties of the various layers coacting together. In particular, the PVDF cover tape 44 bonds and provides all of the properties of the exterior surface of the PVDF laminate material 34. In the same manner, the structural tape 46 provides the strength and gas permeability characteristics of the layers 26 and 30. In particular, the structural tape 46 includes the liquid crystal polymer yarn material 50 adjacent the same like material of the laminates 20. And the polyimide layer 54 provides the laser threat protection characteristics and gas permeability characteristics that are also found in the layer 30.

Figure 4:
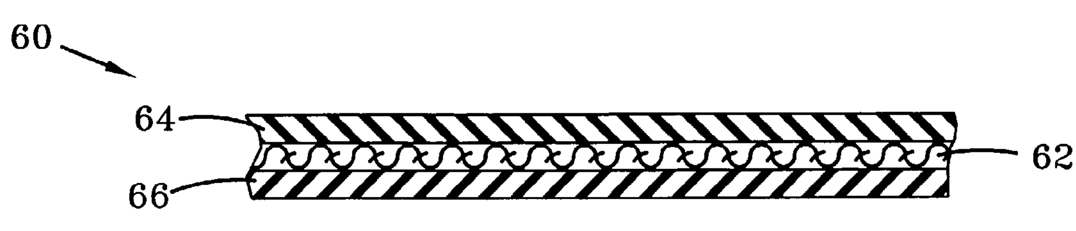
FIG. 4 is a construction of an alternative embodiment according to the present invention.

Referring now to FIG. 4 it can be seen that an alternative material construction according to the present invention is designated generally by the numeral 60. This construction includes a liquid crystal polymer layer 62, such as Vectran™ or its equivalent, which is sandwiched in between an outer PVDF layer 64 and an inner PVDF layer 66. This embodiment provides most all of the benefits and attributes of the previous embodiment and eliminates the need for the polyurethane adhesive materials. To secure the layers to one another the PVDF layers 64 and 66 are heat bonded to one another with the layer 62 sandwiched therebetween. The materials could be secured to one another with a "nip roll" process wherein the three layers are drawn between a pair of heated rollers. The combined heat and pressure exerted by the rollers fuse the PVDF layers 64, 66 to one another with the liquid crystal polymer layer 62 captured therebetween. Alternatively, the liquid crystal polymer layer may be pulled through an extruder which surrounds the layer 62 on both sides with the PVDF material. Accordingly, with the absence of the adhesives, the material 60 has less weight and allows for much easier manufacturing of the material 60. And, any seams that are required can also be constructed by heat bonding a like material on the exterior and interior surfaces of the material 60 as needed.

Based on the foregoing, the advantages of the present laminate material construction are readily apparent. In particular, the present constructions provide for high strength and low weight characteristics which allow for maximum altitude of the lighter-than-air vehicle while providing light weight construction to increase the amount of payload that can be carried by the vehicle 10. Indeed, the preferred laminate or material weighs less than 5 ounces per square yard. The combination of the materials provides excellent permeability to retain the lighter-than-air gas and also provides the needed threat deterrence that may be encountered from infrared or laser type detection devices. The present invention is also advantageous in that the materials are flexible and can withstand wide temperature variations ranging anywhere from −100° C. to +60° C. Accordingly, the disclosed construction and methods for seaming or joining the laminate materials to one another are clearly an improvement in the art of laminate materials used in lighter-than-air vehicles.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A laminate material consisting essentially of:

a liquid crystal polymer fiber layer, wherein said liquid crystal polymer fiber layer is a construction having warp strands and fill strands;

a polyimide layer secured to said liquid crystal polymer fiber layer; and a polyvinylidene fluoride layer secured to said polyimide layer.

2. The laminate material according to claim 1, wherein polyurethane adhesive is disposed between said liquid crystal polymer fiber layer and said polyimide layer, and between said polyimide layer and said polyvinylidene fluoride layer.

3. The laminate material according to claim 2, wherein said polyurethane adhesive is a fluorinated polyurethane.

4. The laminate construction material according to claim 1, wherein the warp direction of the laminate has a tensile strength of at least 240 lbs/inch.

5. The laminate construction material according to claim 1, wherein the fill direction of the laminate has a tensile strength of at least 180 lbs./inch.

6. The laminate material according to claim 1, wherein the overall weight of the laminate is less than 5 ounces per square yard.

7. The laminate material according to claim 1, wherein said liquid crystal polymer fiber layer is in uninterrupted contact with said polyimide layer such that no other non-bonding material contacts a facing side of said polyimide layer.

8. A laminate material consisting essentially of:

a liquid crystal polymer fiber layer; and a polyvinylidene fluoride (PVDF) layer disposed on both sides of said liquid crystal polymer fiber layer.

9. The material according to claim 8, wherein all of said layers are heat bonded to one another.

10. The material according to claim 8, wherein all of said layers are bonded to one another without adhesive.

11. A laminate material comprising:

a liquid crystal polymer fiber layer, wherein said liquid crystal polymer fiber layer is a construction having warp strands and fill strands;

a polyimide layer secured to said liquid crystal polymer fiber layer;

a polyvinylidene fluoride layer secured to said polyimide layer; and polyurethane adhesive disposed between said liquid crystal polymer fiber layer and said polyimide layer, and between said polyimide layer and said polyvinylidene fluoride layer.

12. A laminate material according to claim 11, wherein said polyurethane adhesive is a fluorinated polyurethane.

13. A laminate material consisting essentially of:

a liquid crystal polymer fiber layer;

a polyimide layer secured to said liquid crystal polymer fiber layer; and a polyvinylidene fluoride layer secured to said polyimide layer.

14. The laminate material according to claim 13, wherein polyurethane adhesive is disposed between said liquid crystal polymer fiber layer and said polyimide layer, and between said polyimide layer and said polyvinylidene fluoride layer.

15. The laminate material according to claim 13, wherein said polyurethane adhesive is a fluorinated polyurethane.

* * * * *